United States Patent [19]

Kiss

[11] Patent Number: 4,853,674

[45] Date of Patent: Aug. 1, 1989

[54] SIGNALLING APPARATUS FOR HEARING IMPAIRED PERSONS

[76] Inventor: Michael Z. Kiss, 1116-A 8th St., Suite 245, Manhattan Beach, Calif. 90266

[21] Appl. No.: 63,651

[22] Filed: Jun. 18, 1987

Related U.S. Application Data

[63] Continuation-in-part of Ser. No. 887,272, Jul. 21, 1986.

[51] Int. Cl.$^4$ ............................................. G08B 3/00
[52] U.S. Cl. ...................................................... 340/407
[58] Field of Search ............. 340/407, 825.19, 825.36, 340/825.44, 825.46, 825.48, 825.49, 825.72, 815.21, 311.1, 310 CP, 310 R, 540; 455/343; 381/107

[56] References Cited

U.S. PATENT DOCUMENTS

| | | | |
|---|---|---|---|
| 4,114,142 | 9/1978 | Wycoff et al. | 340/825.44 |
| 4,173,754 | 11/1979 | Feiker | 340/310 R |
| 4,237,449 | 12/1980 | Zibell | 340/407 |
| 4,297,677 | 10/1981 | Lewis et al. | 340/540 |
| 4,365,238 | 12/1982 | Kollin | 340/310 CP |
| 4,370,753 | 1/1983 | Ehmke | 340/825.48 |
| 4,435,846 | 3/1984 | Weise | 455/343 |
| 4,461,025 | 7/1984 | Franklin | 381/107 |
| 4,506,386 | 3/1985 | Ichikawa et al. | 455/343 |
| 4,518,961 | 5/1985 | Davis et al. | 340/825.44 |
| 4,668,949 | 5/1987 | Akahori et al. | 340/825.44 |

Primary Examiner—Gerald L. Brigance
Assistant Examiner—Richard Hjerpe
Attorney, Agent, or Firm—Freilich Hornbaker Rosen & Fernandez

[57] ABSTRACT

A system for hearing impaired persons for nonaudibly signalling the occurrence of monitored events such as an audible event (e.g. a baby crying), a telephone line signal, a switch closure, or a transducer output. The system includes a receiver module for producing a nonaudible signal responsive to an RF signal command, modulated by both a common and an identification frequency tone, received from one or more transmitter modules, each monitoring a predetermined set of events. The receiver and transmitter modules are configured to consume sufficiently low electric power to enable them to be battery energized. Battery energization permits the receiver module to be packaged in a pocket sized portable unit which the hearing impaired person can carry with him in his normal daytime activities.

9 Claims, 5 Drawing Sheets

SIGNALLING APPARATUS FOR HEARING IMPAIRED PERSONS

RELATED APPLICATIONS

This application is a continuation-in-part of application Ser. No. 887,272 filed July 21, 1986, whose disclosure is by reference incorporated herein.

BACKGROUND OF THE INVENTION

The present invention is directed to a system for hearing impaired persons for nonaudibly signalling the occurrence of monitored events. Such monitored events would typically comprise an audible event (e.g. the sounding of a fire alarm), a telephone line signal, a switch closure, or a transducer output.

The prior art is replete with systems useful by hearing impaired persons for nonaudibly signalling monitored events. Such prior art has been cited in applicant's parent application and includes:

| | |
|---|---|
| 3,618,070 | (Kagan) |
| 3,911,416 | (Feder) |
| 4,057,790 | (Fleming) |
| 4,237,449 | (Zibell) |
| 4,365,238 | (Kollin) |

SUMMARY OF THE INVENTION

The present invention is directed to an improved signalling system including a receiver module for producing a nonaudible signal responsive to an RF signal command received from one or more transmitter modules, each transmitter module monitoring a predetermined set of events.

In accordance with the invention, the receiver and transmitter modules are configured to consume sufficiently low electric power to enable them to be battery energized. Battery energization is important because it permits the receiver module to be packaged in a pocket sized portable unit which the hearing impaired person can carry with him in his normal daytime activities. In a typical application, one or more transmitter modules would be deployed within the area of a house, apartment, office, hotel room, etc. to monitor certain events. In response to the occurrence of a monitored event, the transmitter module transmits an RF signal command to cause the receiver module to produce a nonaudible signal to alert the user that the event, e.g. fire alarm sounding, has occurred.

The receiver module includes one or more signal lamps for producing a nonaudible visual signal. The lamps are illuminated in response to an RF signal command and identify the particular transmitter module which has detected the occurrence of the monitored event. The receiver module additionally includes an internal vibrator which is activated in response to the RF signal command to produce a nonaudible tactile signal to alert the user that one of the transmitter modules has alarmed.

In accordance with the invention, each transmitter module is configured to consume very low power permitting it to be battery operated and contained in a very small package. This enables a transmitter module to be readily moved from one site to another; e.g. from home to office or from near a door bell for daytime use, to near a smoke detector for nighttime use.

In accordance with a preferred embodiment of the invention, each transmitter module is comprised of a monitoring section and a transmitting section. In order to minimize power consumption, only the monitoring section is energized, i.e. powered, in the standby state. The transmitting section is powered only when the monitoring section detects the occurrence of a monitored event.

In accordance with a further feature of the preferred embodiment, the transmitting section, when powered, modulates an RF carrier signal with two different frequency tones, one frequency tone (F1) uniquely identifying the particular module transmitting and the other frequency tone ($F_C$) being common to all transmitter modules in the system. In accordance with another aspect of the preferred embodiment, all transmitter modules in the system generate a carrier signal having the same RF frequency.

In accordance with a still further feature of the preferred embodiment, the receiver module includes an RF detecting section and a modulating signal decoding section. In order to minimize power consumption, only the RF detecting section and a portion of the decoding section is powered in the standby state. The remaining portions of the decoding section are powered only when the detecting section detects an RF signal command from a transmitter module.

In accordance with a still further feature of the preferred embodiment, the receiver module detecting section incorporates an automatic gain control (AGC) loop including a pulsed switch. This enables the detecting section to be powered at a very low level during the standby state.

In accordance with a still further feature of the preferred embodiment, the receiver module decoding section includes a separate decoder circuit for each of the aforementioned unique frequency tones, and a single decoder circuit for the common frequency tone. The decoder circuits are interconnected so that the unique frequency decoder circuits are not powered until the common decoder circuit is activated by the output of the RF detecting section.

In accordance with a still further feature of the preferred embodiment, each frequency decoder circuit is connected to a unique receiver module signal lamp via a latch circuit. An adjustable timing circuit is provided for limiting the on duration of each of the lamps.

In accordance with a still further feature of the preferred embodiment, the receiver module, in addition to including lamps and an internal vibrator for nonaudibly signalling, includes means for activating an external vibrator such as a vibrator placed under the mattress of a user. This feature of applicant's preferred embodiment enables a user to carry the receiver module with him during the day and then place it on his bedstand at night, connected to the mattress vibrator so that he will be alerted to any monitored events which occur while he sleeps.

In accordance with a still further feature of the preferred embodiment, an alarm clock means is used to produce a signal for alternatively activating one of the vibrators via the receiver module output switch.

DESCRIPTION OF PREFERRED EMBODIMENT

Figure 1:
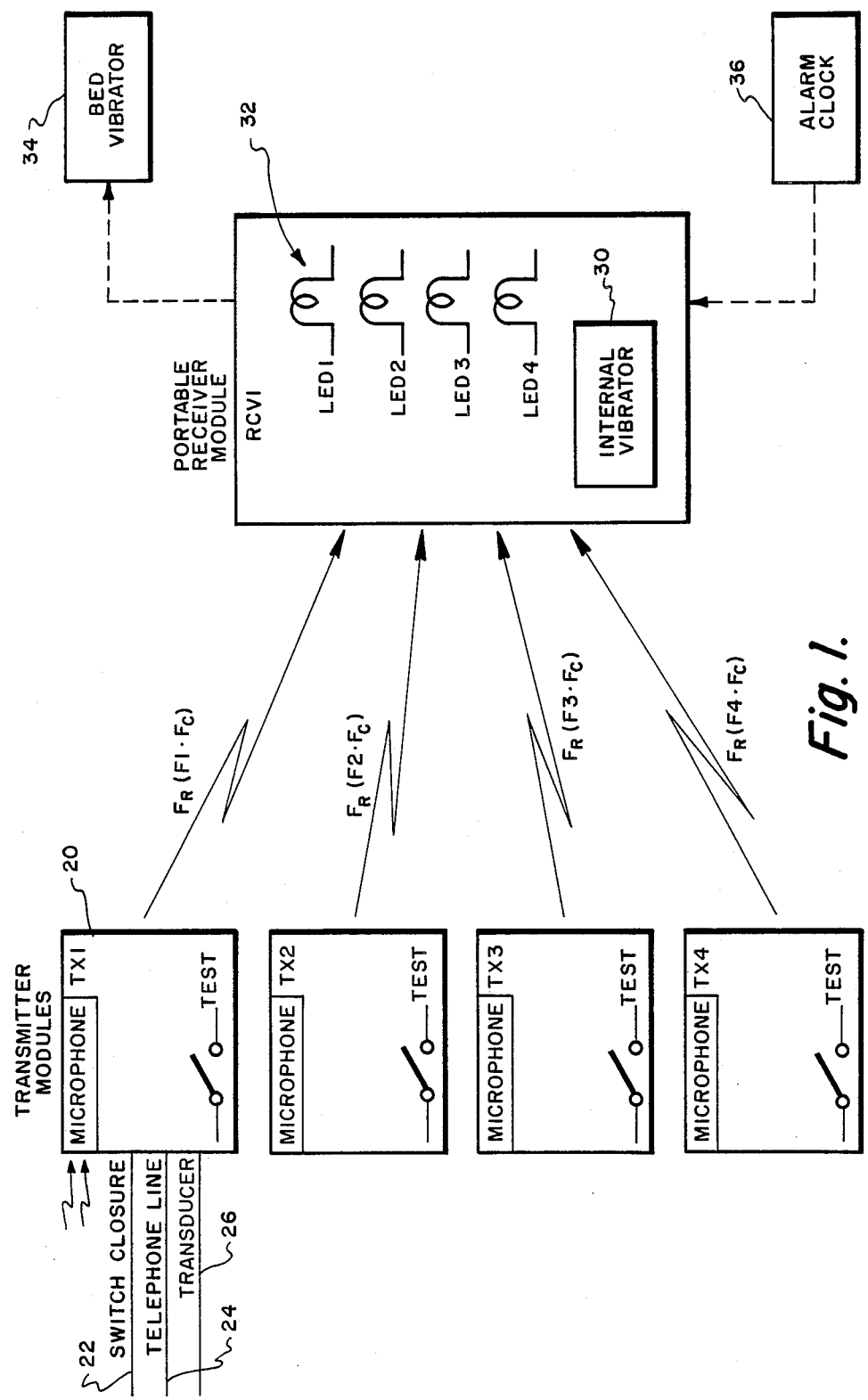
FIG. 1 is a block diagram of a system in accordance with the present invention.

Attention is initially directed to FIG. 1 which comprises a block diagram of a system in accordance with the present invention for nonaudibly signalling hearing impaired persons of various monitored events. As illustrated, the system of FIG. 1 is comprised of a plurality of transmitter modules TX1, TX2, TX3, TX4 and a receiver module RCV1. Each of the transmitter modules functions to monitor one or more of a predetermined set of events, such as an audible event, a switch closure, a telephone ringing, a transducer output, etc. Preferably each transmitter module includes an internal microphone 20 for sensing an audible event, such as a baby's cry, and multiple input terminals 22, 24, 26, for connection to external alarming devices. For example, input terminal 22 might typically be connected to a switch to sense a closure, e.g. a doorbell switch. Input terminal 24 might be connected to a telephone line to directly sense a ringing signal. Input terminal 26 might typically be connected to sense the output of a transducer which might, for example, comprise a vibration sensing security device.

Each of the transmitter modules is connected to monitor a particular set of events. Upon detecting a monitored event, the transmitter module transmits an RF carrier signal of frequency $F_R$, modulated by two frequency tones which respectively comprise an identification signal and a common signal. Thus for example, when transmitter module TX1 detects a monitored event, it transmits an RF carrier signal of frequency $F_R$ modulated by an identification signal of frequency F1 and a common signal of frequency $F_C$. In accordance with the invention, the RF carrier signal frequency is the same for all transmitter modules in the system, e.g. $F_R = 300$ MHz. Similarly, the common signal frequency is the same for all transmitter modules in the system, e.g. $F_C = 1215$ Hz. However, the identification signal from each transmitter module has a unique frequency, e.g. between 699 Hz and 948 Hz.

In accordance with the invention, the receiver module RCV1 is intended to be worn by the hearing impaired person, e.g. on his belt, during normal daytime activities. As will be discussed hereinafter, the receiver module RCV1 incorporates an internal vibrator 30 for producing a nonaudible tactile signal to alert the user that one of the transmitter modules has alarmed and is transmitting. The receiver module RCV1 additionally includes a bank of lamps 32, each lamp for producing a nonaudible visual signal to indicate that a particular one of the transmitter modules has alarmed and is transmitting. Thus, FIG. 1 shows bank 32 as being comprised of signal lamps LED1, LED2, LED3, and LED4 which respectively indicate that transmitter modules TX1, TX2, TX3, and TX4 have alarmed.

As will be discussed hereinafter, both the transmitter modules and the receiver module are configured so as to consume very low levels of electric power when in their standby state so as to enable them to be battery powered. This aspect of applicant's preferred embodiment is important because it enables the receiver module to be packaged in a pocket sized portable unit which the hearing impaired person can readily carry with him. Moreover, by configuring the transmitter modules to be battery powered, they can be readily moved from one site to another. Thus, a transmitter module could be deployed within the area of a house or apartment and be redeployed by a hearing impaired person when he visits a hotel, for example.

In a typical use of the system, each of the transmitter modules would be deployed to monitor a different set of events. When one of the monitored events occurs, it alarms one of the transmitter modules (e.g. TX1) to cause it to transmit the RF carrier signal $F_R$ modulated by the common signal $F_C$ and the identification signal F1 unique to transmitter module TX1. This action causes the receiver module RCV1 to energize the internal vibrator 30 to provide a tactile signal to the user and the lamp LED1 to inform the user that transmitter module TX1 has been alarmed.

Whereas it is intended that the receiver module RCV1 be carried by the hearing impaired person during all of his normal daytime activities, it is also intended that the receiver module be placed on the user's bed stand at night to alert the user of monitored events. Thus, in a typical application, the receiver module is connected to a bed vibrator 34, to be discussed hereinafter, to awake a user at night when one of the monitored events occurs. The bed vibrator 34 comprises an external nonaudible tactile signalling device providing a function similar to that provided by the internal vibrator 30 when the receiver module is worn by the user. It is additionally contemplated that the user can readily connect an alarm clock 36 to the receiver module RCV1. At the indicated time, the alarm clock 36 will provide a direct signal input to the receiver module RCV1 for activating the bed vibrator 34.

Figure 2:
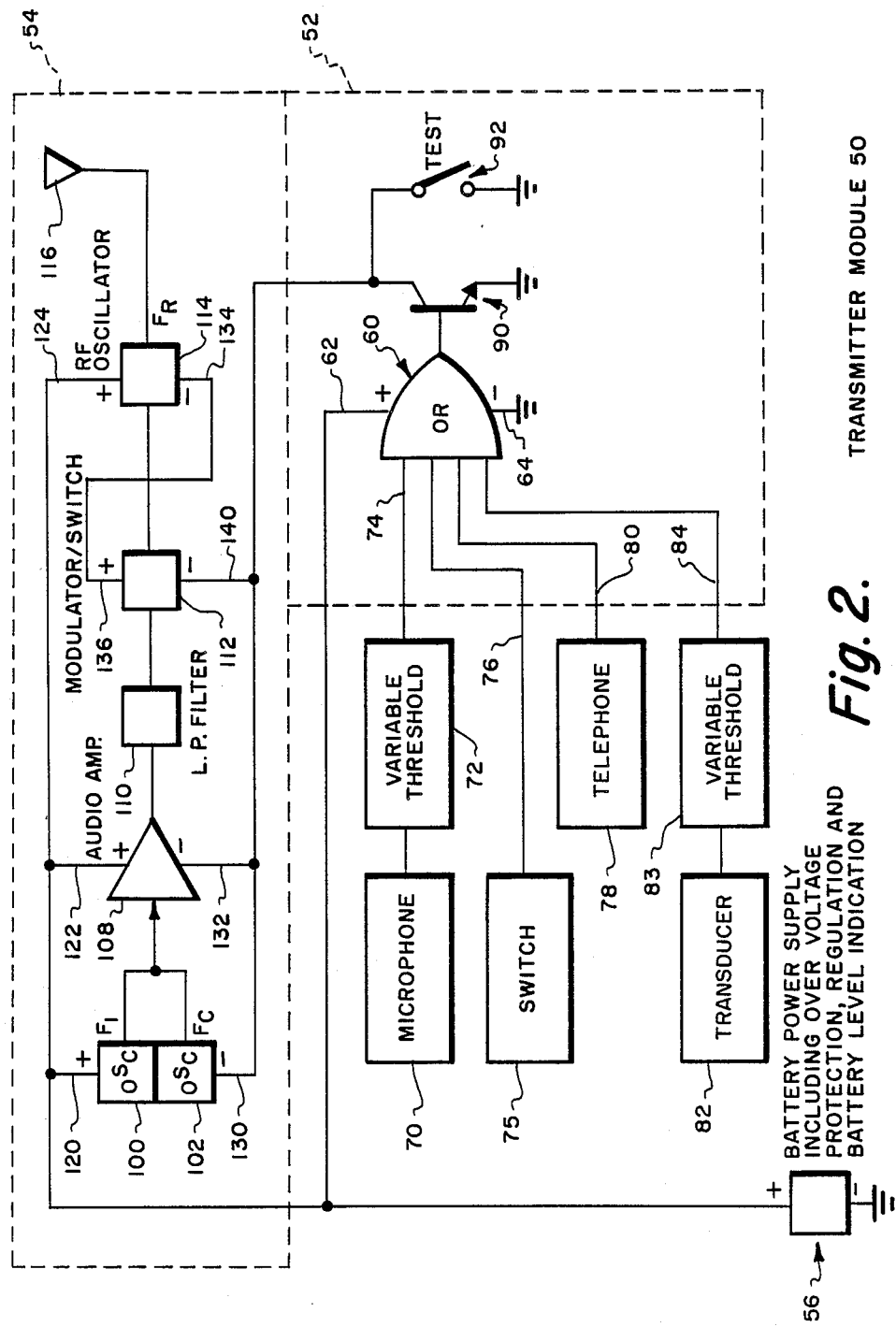
FIG. 2 is a block schematic diagram of a transmitter module in accordance with the preferred embodiment of the invention.

Attention is now directed to FIG. 2 which depicts a preferred embodiment of a transmitter module 50 in accordance with the present invention. Basically, the transmitter module 50 consists of a monitoring section 52, a transmitting section 54, and a battery power supply 56. The battery 56 is depicted with its negative terminal connected to ground and with its positive terminal connected to both the monitoring section 52 and transmitting section 54.

More specifically, the monitoring section 52 is depicted as including a logical OR gate 60 having its power supply terminals 62, 64 respectively connected to the positive terminal of battery 56 and to ground. The signal inputs to OR gate 60 are derived from the aforementioned monitoring devices. Thus, a microphone 70, preferably housed within the transmitter module enclosure, is depicted as connected through a variable threshold circuit 72 to a first signal input 74 of OR gate 60. A switch 75 is connected to a second input 76 of OR gate 60. A telephone 78 is connected to OR gate input 80 and a transducer 82 is connected via variable threshold circuit 83 to OR gate input 84. When any of the monitored devices, i.e. microphone 70, switch 72, telephone 78, or transducer 82 provides an enabling output, the OR gate 60 in turn will on-bias NPN transistor 90. More specifically, the output of OR gate 60 is connected to the base of transistor 90 whose emitter is connected to ground. The collector of transistor 90 is connected to the negative power supply terminal of various circuits of the transmitting section 54 as will be described hereinafter.

A test switch 92, depicted as a single pole single throw switch, is connected in parallel across the emitter and collector of transistor 90. Thus, manual closure of the test switch 92 has the same effect on the transmitting section 54 as the OR gate 60 on biasing the transistor 90.

The transmitting section 54 includes oscillators 100 and 102. Oscillator 100, when powered, supplies a frequency tone signal (i.e. F1 or F2 or F3 or F4) unique to the particular transmitting module. Thus, on the assumption that FIG. 2 depicts transmitter module TX1, oscillator 100 outputs an identification signal of frequency F1. Oscillator 102 outputs the common signal of frequency $F_C$. The outputs of oscillators 100 and 102 are applied to the input of an audio amplifier 108 whose output is applied through a low pass filter 110 (e.g. having a frequency cutoff of 10 KHz) to a modulator/switch 112. The signal output from the modulator/switch is applied to an RF oscillator 114 to modulate an RF carrier signal of frequency $F_R$. The output of RF oscillator 114 is connected to antenna 116.

In order to minimize the power consumption of the transmitter module 50 to enable it to properly operate with a battery power supply 56, the transmitting section 54 is configured so as to consume essentially no power while in a standby state. More specifically, note in FIG. 2 that the positive terminal of the battery 56 is connected to the positive power supply terminal 120 of oscillators 100, 102, terminal 122 of audio amplifier 108 and terminal 124 of RF oscillator 114. Also note that the negative power supply terminal 130 of oscillators 100, 102 is connected through the collector-emitter path of transistor switch 90 to ground. The negative power supply terminal 132 of audio amplifier 108 is similarly connected to ground through transistor 90. The negative power supply terminal 134 of RF oscillator 114 is also connected (via modulator/switch 112) through transistor 90 to ground.

With transistor 90 off-biased and with test switch 92 open, the aforementioned transmitting section 54 circuits will consume essentially no power. Thus, when the transmitter module 50 of FIG. 2 is in its standby state, only the monitoring section 52 will consume power. That is, the OR gate 60 will be powered awaiting an enabling input from the microphone 70, switch 75, telephone 78 or transducer 82, each monitoring the occurrence of a particular event. When any of these devices provides an enabling input, OR gate 60 will on bias transistor 90 thereby supplying a path to ground from each of the aforementioned negative power supply terminals 130, 132, and 140. Only when transistor 90 is on biased (or when the manual test switch 92 is closed) will the potential of battery 56 be applied across the power supply terminals of oscillators 100, 102, audio amplifier 108, and RF oscillator 114-modulator/switch 112. Thus, until transistor 90 is on-biased by the detection of a monitored event, the transmitter module 50 will consume very little power (e.g. 1 milliamp in standby and 20-30 milliamps when active).

When a monitored event does occur, then oscillators 100, 102 will be powered to output both the identification frequency tone F1 and common frequency tone $F_C$ to the audio amplifier 108. The output of the audio amplifier 108 is passed through low pass filter 110 to close modulator/switch 112 and thereby power oscillator 114 and apply tones F1 and $F_C$ thereto. When powered, oscillator 114 will supply said RF carrier signal of frequency $F_R$, modulated by the tones F1 and $F_C$ to the transmitting antenna 116.

Figure 3:
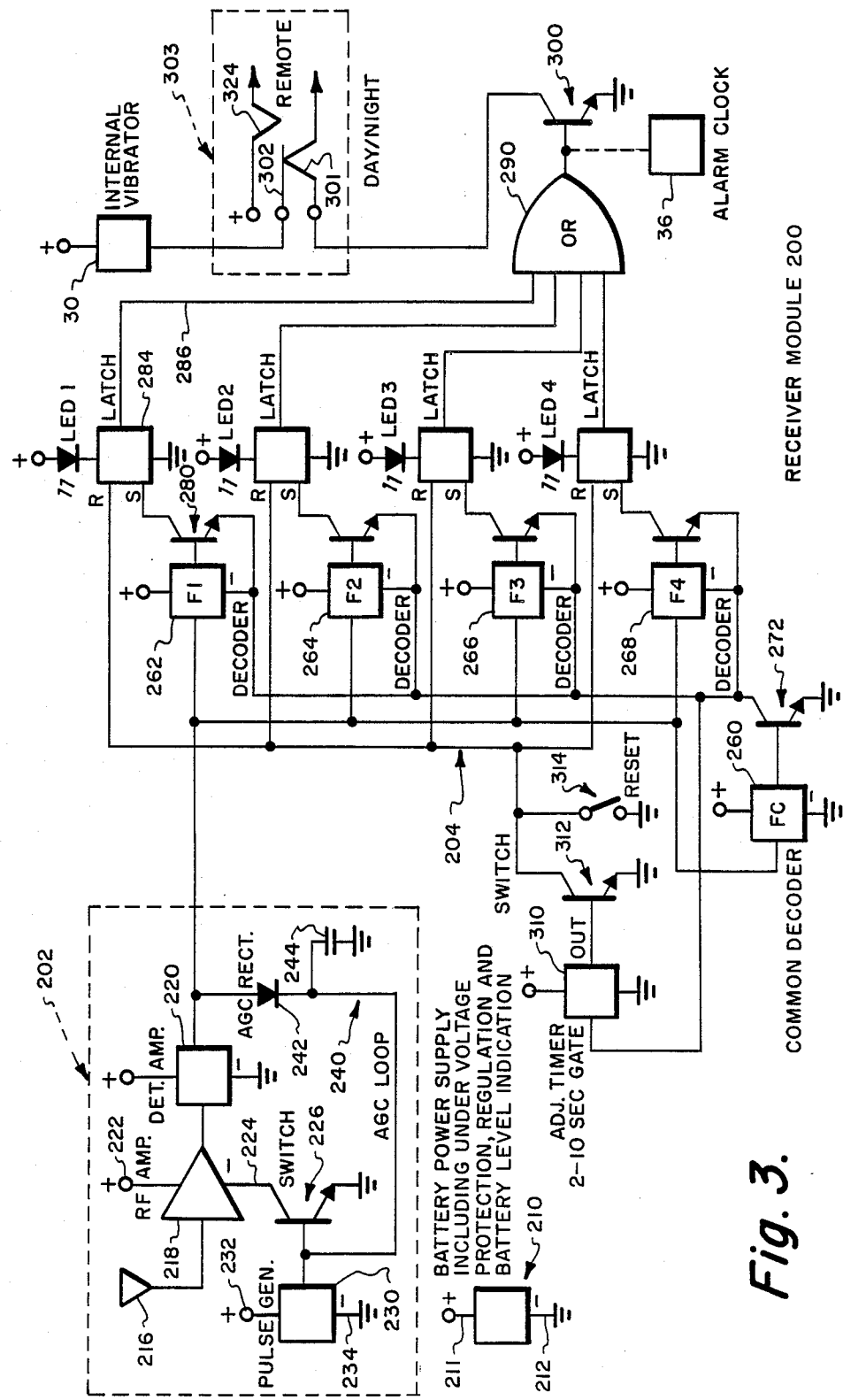
FIG. 3 is a block schematic diagram of a receiver module in accordance with a preferred embodiment of the present invention.

Attention is now called to FIG. 3 which comprises a block schematic diagram of a preferred embodiment 200 of the receiver module RCV1 of FIG. 1. The receiver module 200 is basically comprised of an RF detecting section 202 and a modulating signal decoding section 204. Briefly, the function of the detecting section 202 is to receive the modulated RF carrier from the transmitter modules and remove the carrier signal component in order to provide the modulating frequency tones to the signal decoding section 204. The output of the decoding section 204 controls the lamps of lamp bank 32 and vibrators 30 and 34, previously mentioned in connection with FIG. 1.

The detecting section 202 and decoding section 204 are both powered by a battery power supply 210 (typically including a battery and regulation and over-voltage protection circuitry) whose positive terminal 211 is to be understood as being connected to the positive power supply terminals of all of the circuits depicted in FIG. 3. The battery power supply negative terminal 212 is connected to ground. As will be discussed hereinafter, the detecting section 202 and decoding section 204 are configured to minimize power consumption in order to make battery energization feasible. Briefly, in order to minimize power consumption, only the RF detecting section 202 and a portion of decoding section 204 is powered in the standby state. Power is withheld from most of the circuits of the decoding section 204 (by use of a switched ground connection to the circuits negative power supply terminals) until the detecting section 202 detects an RF signal command from a transmitter module.

More specifically, the RF detecting section 202 includes an antenna 216 for receiving the modulated RF signal transmitted by antenna 116 of FIG. 2. The output of antenna 216 is coupled to the signal input of an RF amplifier whose output is coupled to the signal input of a detector amplifier 220. The positive power supply terminal 222 of RF amplifier 218 is connected to the positive terminal of battery 210. The negative power supply terminal 224 of amplifier 218 is connected to the collector of NPN transistor switch 226. The emitter of transistor 226 is connected to ground. A pulse generator 230 has its positive power supply terminal 232 connected to the positive terminal of battery 210 and its negative power supply terminal 234 connected to ground. Thus pulse generator 230 is constantly energized. The signal output from pulse generator 230 is connected to the base of transistor 226 in order to periodically on bias the transistor and thus connect terminal 224 of amplifier 218 to ground.

Figure 4:
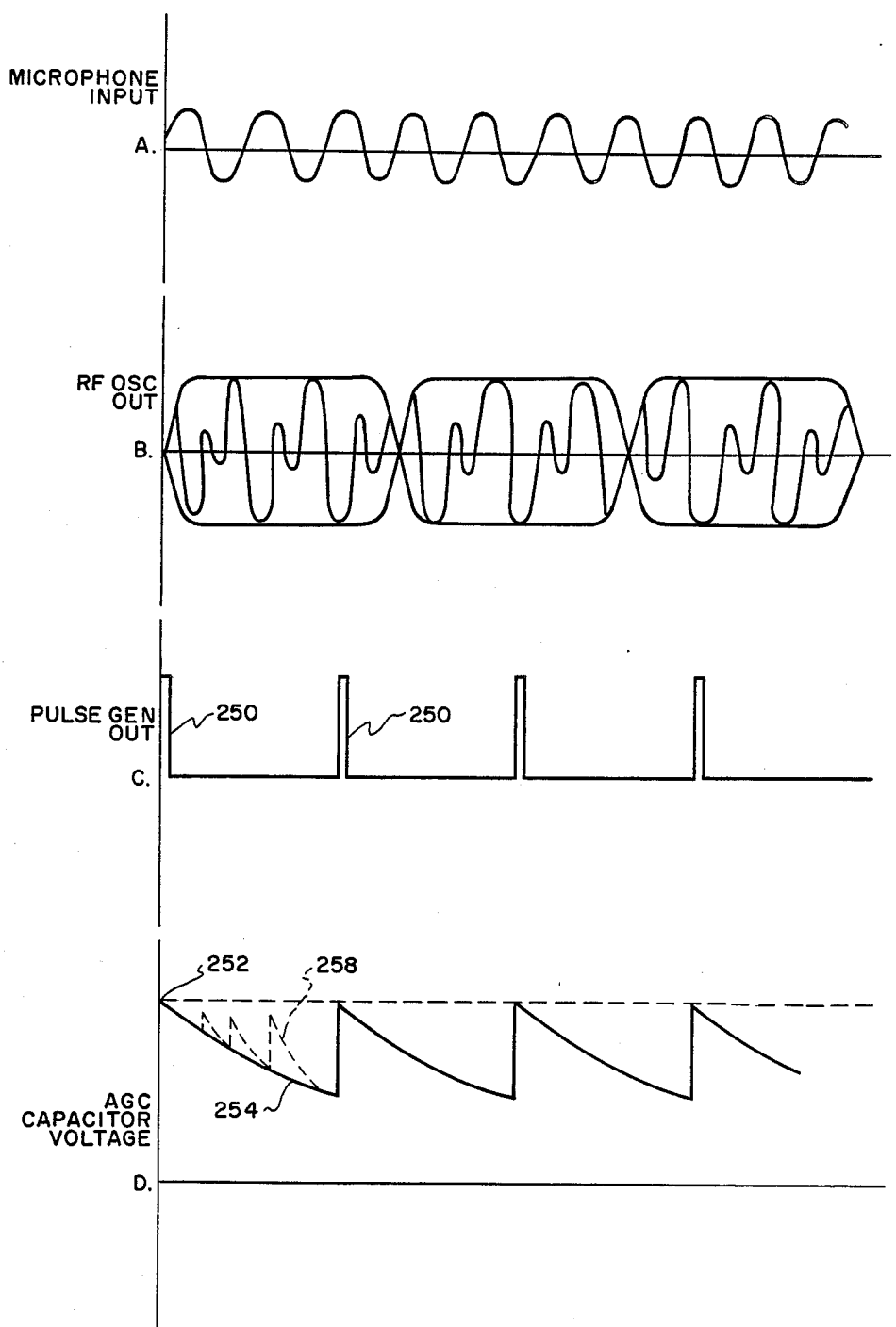
FIG. 4 is a wave form diagram depicting significant signals occurring in the transmitter and receiver modules of FIGS. 2 and 3.

The detecting section 202 additionally includes an automatic gain control (AGC) loop 240 extending from the signal output of amplifier 220 to the base of transistor 226. The AGC loop is basically comprised of a rectifier 242 connected in series between the signal output of amplifier 220 and the base of transistor 226 and a capacitor 244 connected between the rectifier cathode and ground. In order to understand the operation of the AGC loop 240, attention is directed to FIG. 4 which in line A depicts a typical input signal which might by supplied by a microphone 70 (FIG. 2) to OR gate 60 to initiate the transmission of an RF carrier signal modulated by frequency tones F1 and $F_C$ from antenna 116. Line B of FIG. 4 depicts the envelope of a typical RF carrier signal modulated by low frequency tones, i.e. F1 and $F_C$. Line C of FIG. 4 depicts the periodic pulse output from the pulse generator 230 of the detecting section 202 (FIG. 3). Line D of FIG. 4 depicts an exemplary voltage variation across capacitor 244. Assume initially the absence of an RF signal applied to the input of amplifier 218. When pulse generator 230 supplies a periodic output pulse 250, everpresent noise at the signal input of amplifier 218 will produce an output via detector amplifier 220 to charge the capacitor 244 as represented by vertical line 252 in line D of FIG. 4. In the absence of an applied RF carrier signal to amplifier 218, the voltage across capacitor 244 will exponentially decay as represented by the curve 254 until pulse generator 230 generates a subsequent pulse 250. During this period of decay between successive pulses 250, the voltage across capacitor 244 will be sufficient to maintain transistor 226 on biased at a low level so that RF amplifier 218 can respond to a signal input. When an RF carrier signal is applied to the input of amplifier 218, it produces an increased signal output from detector amplifier 220 to increase the voltage across capacitor 244 as represented by the dashed line peaks 258 depicted in line D of FIG. 4. Thus, utilization of the AGC loop 240 will enable the RF amplifier 218 to be maintained in a ready condition during standby, i.e. during the absence of an applied RF signal command, without much power being consumed.

In response to an RF signal command transmitted by one of the transmitter modules 50, the detector amplifier 220 of FIG. 3 will supply an output signal comprised of two frequency tones, i.e. an identification signal of frequency F1 or F2 or F3 or F4 dependent on which transmitter module is active, and a common signal tone $F_C$. As will be seen, the decoding section 204 is basically comprised of four separate decoding channels for processing the four possible identification frequency tones and a single decoding circuit for processing the common frequency tone. The decoding circuits are interconnected so that the identification frequency tone decoding channels are not powered until the common decoding circuit is activated by the frequency tone $F_C$ received from the detector amplifier 220.

The decoding section 204 is comprised of a common decoder circuit 260 for decoding the tone $F_C$ and separate decoder circuits 262, 264, 266, and 268 for respectively decoding the identification tones F1, F2, F3, and F4. Note that the signal output from detector amplifier 220 is applied to the signal input of each of the decoder circuits 260, 262, 264, 266, and 268. Note also that each of the decoder circuits has a positive power supply terminal directly connected to the positive terminal of battery 210. However, only decoder circuit 260 has its negative power supply terminal connected directly to ground. The negative power supply terminals of decoder circuits 262, 264, 266, and 268 are all connected to the collector of NPN transistor switch 272. The emitter of transistor 272 is connected to ground and the base of transistor 272 is connected to the signal output of decoder circuit 260. Thus, during standby, only decoder circuit 260 will consume power. When decoder circuit 260 recognizes a signal of frequency $F_C$ applied to its input, it will on-bias transistor 272 to thereby energize decoder circuits 262, 264, 266, and 268. When energized, each decoder circuit will then respond to its particular identification signal tone output from detector amplifier 220.

Inasmuch as the separate identification signal detector channels are identical, only the channel for signal frequency tone F1 will be considered in detail. Note that the signal output of decoder circuit 262 is connected to the base of NPN transistor switch 80. The emitter of transistor 280 is connected to the collector of the aforementioned transistor 272. The collector of transistor 280 is connected to the set input of a latch, 284. The signal output 286 of latch 284 is connected to the input of an OR gate circuit 290. When the latch 284 is set, it illuminates the aforementioned lamp LED1 of lamp bank 32 referred to in FIG. 1. The identification signal channels associated with decoder circuits for frequency tones F2, F3, and F4 similarly include latch circuits which provide inputs to OR gate 290 and which respectively control LED2, LED3, and LED4.

The output of OR gate 290 is connected to the base of NPN transistor switch 300. The emitter of transistor 300 is connected to ground. The collector of transistor 300 is connected through normally closed contacts 301 and 302 of switch jack 303 to the aforementioned internal vibrator 30. Thus, when the output of OR gate 290 on biases transistor 300, the internal vibrator 30 will be activated. However, when a plug (FIG. 6) associated with the aforementioned bed vibrator 34 is plugged into the switch jack 303, the collector of transistor 300 will be disconnected from contact 302 and routed via the plug to the bed vibrator 34. This will be discussed hereinafter in connection with FIGS. 5 and 6.

The aforementioned optional alarm clock 36 is connected to the base of transistor 300 to provide an on-biasing signal thereto at a designated time. Thus, transistor 300 can be on-biased either via the output of OR gate 290 or the output of alarm clock 36. Preferably, the clock signal pulsates to enable the user to distinguish between a clock initiated alarm and a continuous module initiated alarm. If a transmitter module initiated alarm occurs during a clock alarm condition, it will automatically override the clock alarm.

The decoder section 204 additionally includes an adjustable timer (e.g. 2–10 seconds). A timing interval is initiated when decoder circuit 260 on biases transistor 272. When the timing interval times out, timer 310 on biases transistor switch 312. The emitter of transistor 312 is connected to ground and the collector is connected to the reset inputs of all of the latch circuits 284. Thus, after one of the identification signal decoder circuits, e.g. 262, recognizes an identification signal tone, e.g. F1, it will set the latch 284, and thus energize one of the vibrators connected to the collector of transistor 300, but only until timer 310 times out to thus reset the latch. A manual reset switch 314 is preferably connected across the collector emitter path of transistor 312.

From the foregoing description of the receiver module 200, it should now be apparent that the module is configured so as to minimize power consumption by minimizing the components energized during a standby condition. By minimizing power consumption, the receiver module 200 can be packaged in a small pocket sized unit enabling a hearing impaired person to carry it during all his normal daytime activities so that he can be alerted to various monitored events by the actuation of the internal vibrator 30 providing a nonaudible tactile signal. The tactile signal provided by vibrator 30 does not identify the source of the alarm but merely alerts the user that one of the transmitter modules is transmitting an RF command signal. The particular lamp illuminated, e.g. LED1, identifies to the user which transmitter module has alarmed.

Figure 5:
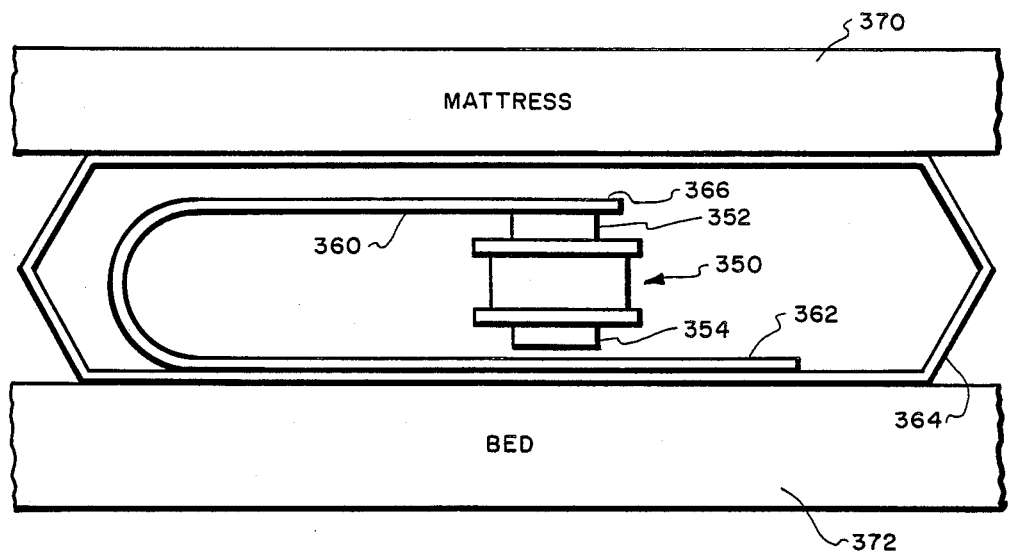
FIG. 5 schematically depicts a mattress vibrator useful in the present invention.
Figure 6:
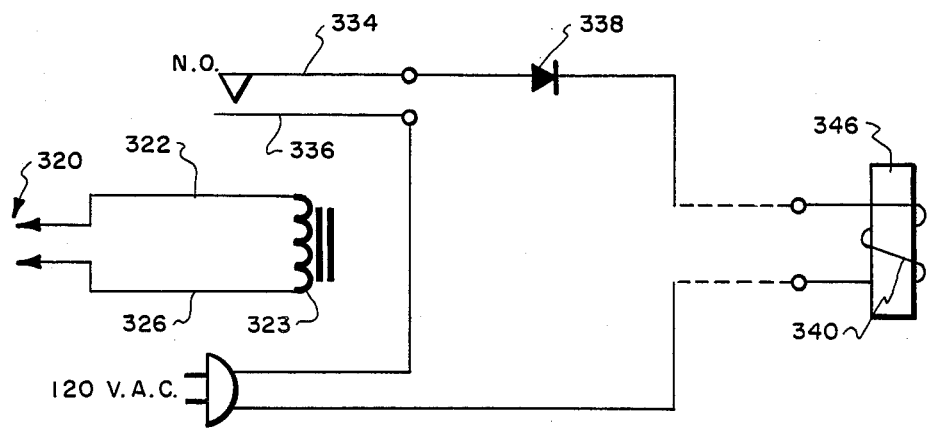
FIG. 6 is a schematic diagram depicting the electrical connections to the mattress vibrator of FIG. 4.

As previously mentioned, it is contemplated that a bed vibrator be connected, via switch jack 303, to the receiver module 200 for nighttime use. More particularly, when plug 320 (FIG. 6) is inserted into the switch jack 303, terminal 322 of solenoid 323 is connected to positive power supply terminal 324 and solenoid terminal 326 is connected via switch contact 301 to the collector of transistor 300. This action will connect the solenoid 323 to the collector of transistor switch 300 instead of the internal vibrator 30. As a consequence, when transistor 300 is on biased, solenoid 323 will be energized to close normally open switch contacts 334 and 336. Contacts 334 and 336 are connected in series between a 120 volt AC line source and a rectifier 338 supplying a coil 340 wound on the core 346 of an electromagnet assembly 350 (FIG. 5). The electromagnet assembly 350 is depicted as including pole pieces 352 and 354. The assembly 350 is mounted on a U shaped spring 360 of negative material having a lower arm 362 and an upper arm 366. The spring 360 is mounted within a flat housing 364 with the arm 362 secured to the housing and with the arm 366 being cantilevered as shown in FIG. 5. The electromagnet assembly 350 is suspended from the cantilevered arm 36 with its pole piece 352 in magnetic contact with the arm 366. As shown in FIG. 5, this places the pole piece 354 close to but spaced from the fixed arm 362. In use, the flat housing 364 is inserted between a mattress 370 and a bed support or box spring 372. In operation, when transistor 300 (FIG. 3) is on biased, solenoid 330 will be energized to close contacts 334, 336. As a consequence, line voltage will be supplied through rectifier 338 to coil 340 of the electromagnet assembly 350. Thus, for each half cycle of the line voltage, the coil 340 will produce a field in the core 346 to attract the pole piece 354 toward the arm 362. Consequently, the electromagnet assembly 350 and arm 366 will be pulled toward the fixed arm 362 at the line voltage frequency, i.e. 60 Hz. This will produce a vibrating tactile sensation in the housing 364 which will transfer to the mattress 370 to arouse a sleeping user. By then glancing at which of the lamps of the lamp bank 32 is illuminated, the user will immediately know which of the transmitter modules has been alarmed.

From the foregoing, it should now be appreciated that a signalling system has been disclosed herein for use by hearing impaired persons for producing a nonaudible signal to indicate the occurrence of a monitored event. The system is basically comprised of one or more transmitter modules and a receiver module with the modules being capable of supplying an RF command signal modulated by two frequency tones; i.e. a frequency tone $FC_C$ common to all of the transmitter modules and an identification frequency tone, e.g. F1, uniquely identifying a particular one of the transmitter modules. In accordance with the invention, the transmitter and receiver modules are configured so as to consume very low power in their standby condition to enable them to operate for extended periods utilizing only battery power as an energy source.

Although a preferred embodiment of the invention has been disclosed herein, it is recognized that modifications and variations will occur to those skilled in the art and consequently it is intended that the appended claims be interpreted to cover such modifications and other equivalents.

I claim:

1. A system useful by hearing impaired persons for monitoring a predetermined set of events to nonaudibly signal the occurrence of one of said events, said system comprising:

a first transmitter module including means responsive to the occurrence of a monitored event for producing an RF carrier signal of frequency $F_R$ modulated by an identification signal of frequency F1 and a common signal of frequency $F_C$;

a second transmitter module including means responsive to the occurrence of a monitored event for producing an RF carrier signal of frequency $F_R$ modulated by and identification signal of frequency F2 and a common signal of frequency $F_C$;

a receiver module packaged in a pocket sized unit which can be readily carried by a hearing impaired person, said receiver module including first and second visual signalling means and analog circuit means responsive to an RF carrier signal of frequency $F_R$ modulated by signals of frequencies F1 and $F_C$ for activating said first visual signalling means and responsive to an RF carrier signal of frequency $F_R$ modulated by signals of frequencies F2 and $F_C$ for activating said second visual signalling means;

said analog circuit means including RF detecting means and modulating signal decoding means, said decoding means including a signal $F_C$ decoder circuit, a signal F1 decoder circuit, and a signal F2 decoder circuit;

battery means mounted in said receiver module package for supplying electric energy;

means connecting said battery means to substantially continually power said RF detecting means and said signal $F_C$ decoder circuit while in a standby state;

means for activating said signal $F_C$ decoder circuit responsive to an RF carrier signal of frequency $F_R$ modulated by said signal of frequency $F_C$;

switch means responsive to the activation of said signal $F_C$ decoder circuit for connecting said battery means to power said signal F1 and F2 decoder circuits;

means for activating said signal F1 decoder circuit responsive to an RF carrier signal of frequency $F_R$ modulated by said signal F1 to illuminate said first visual signalling means; and means for activating said signal F2 decoder circuit responsive to an RF carrier signal of frequency $F_R$ modulated by said signal F2 to illuminate said second visual signalling means.

2. The system of claim 1 wherein said receiver module further includes tactile signalling means; and means responsive to an RF carrier signal modulated by signals of frequencies FC and either F1 or F2 for activating said tactile signalling means.

3. The system of claim 1 wherein each said transmitter module includes monitoring means and transmitting means;

battery means having first and second terminals;

means connecting said battery means terminals to said monitoring means for energizing said monitoring means; and switch means responsive to the occurrence of a monitored event for connecting said battery means terminals to said transmitting means for energizing said transmitting means.

4. The system of claim 3 wherein said transmitting means of said first transmitter module includes:
   means for generating said signal of frequency F1;
   means for generating said signal of frequency $F_C$;
   means for generating said RF carrier signal; and
   means for modulating said RF carrier signal with said signals of frequencies F1 and $F_C$.

5. The apparatus of claim 1 including latch means responsive to the activation of said signal F1 decoder circuit for illuminating said first visual signalling means and responsive to the activation of said signal F2 decoder circuit for illuminating said second visual signalling means.

6. The apparatus of claim 5 further including adjustable means for varying the latch duration of said latch means.

7. A system useful by hearing impaired persons for monitoring a predetermined set of events to nonaudibly signal the occurrence of one of said events, said system comprising:
   a first transmitter module including means responsive to the occurrence of a monitored event for producing an RF carrier signal modulated by an identification signal of frequency F1 and a common signal of frequency $F_C$;
   a second transmitter module including means responsive to the occurrence of a monitored event for producing an RF carrier signal modulated by an identification signal of frequency F2 and a common signal of frequency $F_C$;
   said RF carrier signals produced by said first and second transmitter modules being of the same frequency $F_R$;
   a receiver module packaged in a pocket sized unit which can be readily carried by a hearing impaired person, said receiver module including first and second visual signalling means and analog circuit means responsive to an RF carrier signal of frequency $F_R$ modulated by signals of frequencies F1 and $F_C$ for activating said first visual signalling means and responsive to an RF carrier signal of frequency $F_R$ modulated by signals of frequencies F2 and $F_C$ for activating said second visual signalling means;
   said analog circuit means including RF detecting means and modulating signal decoding means, said decoding means including a signal $F_C$ decoder circuit, a signal F1 decoder circuit, and a signal F2 decoder circuit;
   battery means mounted in said receiver module package for supplying electric energy;
   connecting means connecting said battery means to substantially continually power said RF detecting means and said signal $F_C$ decoder circuit while in standby state;
   means for activating said signal $F_C$ decoder circuit responsive to an RF carrier signal of frequency $F_R$ modulated by said signal of frequency $F_C$; switch means responsive to the activation of said signal $F_C$ c decoder circuit for connecting said battery means to power said signal F1 and F2 decoder circuits;
   means for activating said signal F1 decoder circuit responsive to an RF carrier signal of frequency $F_R$ modulated by said signal F1 to illuminate said first visual signalling means; and
   means for activating said signal F2 decoder circuit responsive to an RF carrier signal of frequency $F_R$ modulated by said signal F2 to illuminate said first visual signalling means;
   said RF detecting means including
   RF amplifier means having signal input and output terminals and power supply terminals;
   said connecting means including second switch means for connecting said battery means to said RF amplifier means power supply terminals;
   means for periodically closing said second switch means;
   said RF detecting means further including detector circuit means having signal input and output terminals; and
   means connecting said RF amplifier means signal output terminal to said detector circuit means signal input terminal; and
   feedback means connecting said detector circuit means signal output terminal to said second switch means for closing said second switch means.

8. The apparatus of claim 7 wherein said feedback means includes capacitor means for holding said second switch means closed for so long as the signal produced at said detector circuit means signal output terminal is of sufficient magnitude.

9. A system for a hearing impaired person for nonaudibly signalling the occurrence of one or more monitored events comprising:
   at least one transmitter module including a monitoring section and a transmitting section;
   said transmitting section including means selectively actuatable to transmit an RF carrier signal modulated by first and second frequency tones;
   said monitoring section including means responsive to the occurrence of one of said monitored events for actuating said transmitting section;
   a receiver module packaged in a pocket sized unit which can be readily carried by a hearing impaired person, said receiver module including a detecting section and a decoding section;
   said detecting section including means responsive to said signal transmitted by said transmitting section for separating said first and second frequency tones from said RF carrier signal;
   said decoding section including a first decoder circuit responsive to said first frequency tone for providing an output signal and a second decoder circuit responsive to said second frequency tone for providing an output signal;
   battery means mounted in said receiver module package;
   means directly connecting said battery means to said first decoder circuit for substantially continually supplying operating electric power thereto while in a standby state;
   switch means responsive to said first decoder circuit output signal for connecting said battery means to said second decoder circuit for supplying operating electric power thereto; and
   means responsive to said second decoder circuit output signal for producing a tactile signal perceptible by said hearing impaired person.

* * * * *